3,383,918
TEMPERATURE MEASUREMENT AND CONTROL
David Charles Cumbers, Pontypool, and Walter Leonard French, Clydach, England, assignors to Imperial Chemical Industries Limited, London, England, a corporation of Great Britain
Filed July 22, 1966, Ser. No. 567,136
Claims priority, application Great Britain, July 26, 1965, 31,781/65
6 Claims. (Cl. 73—351)

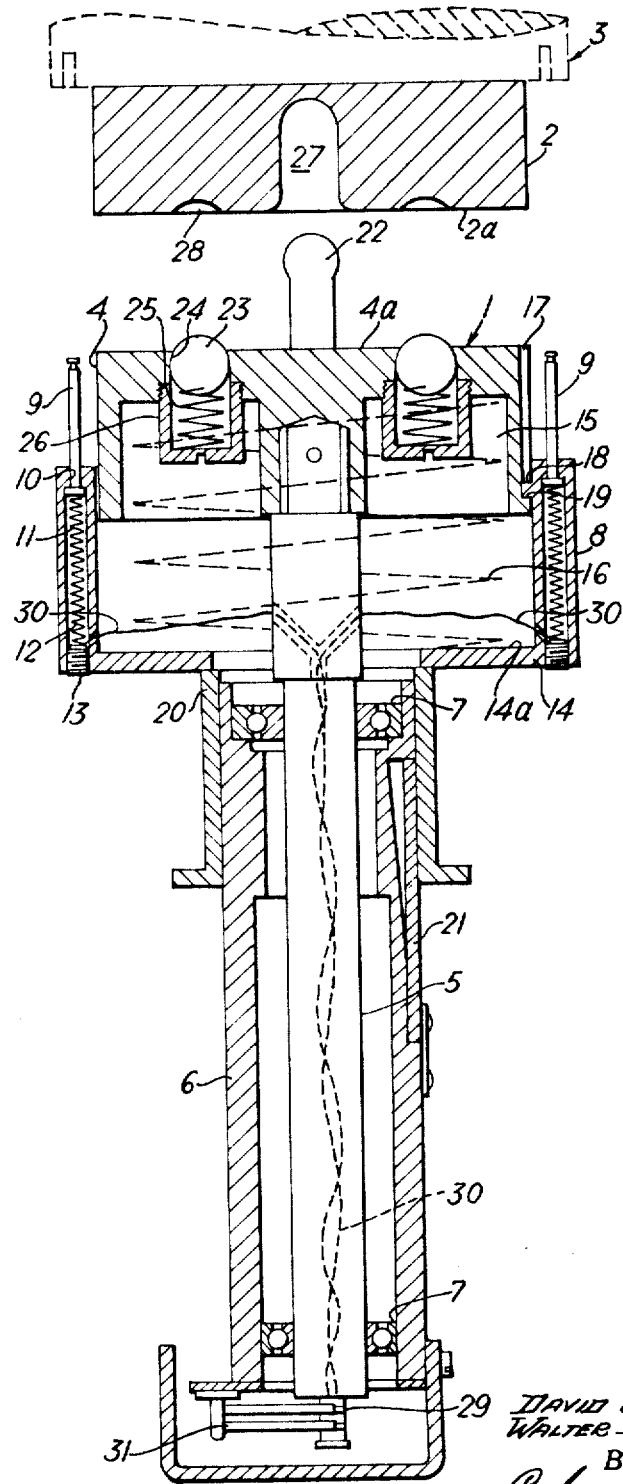

This invention relates to apparatus for measuring the surface temperature of rotating members, such as rolls or godets, in textile fibre processing equipment.

There are numerous instances in textile fibre processing where running filaments or yarns pass in contact with a heated or hot rotating member and it is well known that it is very important in the processing of continuous spun filaments and yarns of synthetic polymers such as nylon that the filaments and yarn shall be subjected to non-fluctuating temperature conditions in the course of processing since even slightly differing heat treatments of different yarns can cause marked differences in resultant yarn properties such as dyeability with certain types of dyestuffs. There is a need for means whereby to determine quickly as and when desired and without interrupting filament or yarn processing a measure of the surface temperature of such hot or heated rotating members as hot-relaxation rolls or hot draw rolls.

The object of the present invention is to provide apparatus for measuring the surface temperature of a heated rotating yarn contacting member characterised in that the apparatus comprises, in combination, a member attachable to or providing the end face of a rotating member suitable for use as a hot-relaxation member, heat setting member or hot drawing member in textile-fibre processing equipment and a sensor head that is mounted for free rotation about an axis that passes therethrough, and said head includes one or more retractable temperature sensing probes that can be advanced from a position or positions in which the probe or probes is or are to the rear of the end face of the sensor head to a position or positions in which the probe or probes may be inserted into registering pockets close beneath the contact surface of said yarn contacting member for member-temperature measurement, means for advancing and retracting the probe or probes while the sensor head carrying said probe or probes is rotating about its axis said probe or probes being adapted for connection or connected to temperature-indicating means, and the construction of said member and the sensor head is such that the sensor head (other than the probes) would, in use, be substantially thermally isolated from the said yarn contacting member and that mutually cooperating head centering and torque-transmitting mating male and female portions are provided at the said end faces of the member and sensor head that are capable of effecting centering of the sensor head with respect to the member when said member rotates about its axis common with the rotary axis of the sensor head and of transmitting torque from the rotating member to the sensor head to effect a gradual acceleration of the sensor head to synchronization with the member, the male portion or portions of the torque-transmitting portions being resiliently yieldably mounted on the sensor head and presenting oblique abutment surfaces to surfaces on associated female portion or portions on the member so that, whenever the male portion or portions of the torque-transmitting portions are in register with such female portion or portions in the course of rotation of the member with respect to the sensor head (i.e. while synchronization is still being approached) so as temporarily to remove a restraint thereon and allow the male portion or portions to enter said female portion or portions and to present said oblique surfaces to surfaces on said female portion or portions for torque application to the sensor head, the male portion or portions remain in mating relationship with said female portion or portions only for so long as the component of the torque-generating forces in the direction of resilient displacement of the male portion or portions retains it or them in mating relationship with said female portion or portions.

The apparatus is advantageously used in the course of yarn or filament stretching, heat setting or hot-relaxation on rotating heated rolls.

The sensor head may, for example, be part of a hand-portable device or may be carried on a wheeled frame. The latter arrangement is very convenient when a continuous check on a large number of similarly-arranged well-ordered rolls at uniform heights is to be kept.

Rotatable members such as draw rolls, setting rolls and hot-relaxation rolls already always have one of their ends freely exposed and the methods of the present invention demand no alteration or departure from present day roll-mounting and driving techniques.

To achieve adequate thermal isolation of the sensor head from the rotating member it is best if the rotating member has secured at a free exposed end an attachment (say a plate or block) of tough material of poor thermal conductivity. A most suitable material is that marked under the trade name "Tufnol." Such thermal isolation is required least the mere act of temperature recordal itself effect a substantial reduction in the temperature of the rotating member by virtue of heat loss to the sensor head. The sensor head may interact directly with said attachment to achieve gradually said synchronous rotation.

Where the sensor head is part of a device adapted for hand use the sensor head is advantageously secured at one end of a shaft that extends within, and is rotatable with respect to, a sleeve of small enough external dimensions to allow of convenient gripping by an operative.

Advantageously, the sensor head comprises a generally cylindrical portion that interacts with the rotating member to achieve said synchronous rotation therewith and an annular probe-carrying portion that closely surrounds and rotates with said cylindrical portion and can slide axially with respect to the cylindrical portion for probe-insertion and retraction at and after temperature measurement. Advantageously, resilient means is provided that acts to tend to maintain the annular portion in a position in which the probes are retracted. The probes may be inserted into the registry pockets by manually urging the annular portion towards the end face of the rotating member at synchronous rotation therewith.

Advantageously every probe is a thermocouple junction and extends parallel to the rotary axis of the sensor head.

The electrical current leads to the junction may suitably extend from annular contact rings fixed on a part rotating with the junction against which bear non-rotating leaf spring contacts electrically coupled to the remainder of the temperature measuring means. Such arrangements are, of course, well known. Advantageously, every probe is resiliently (preferably sprung) loaded in order that the probe shall not be subjected to undue stress when fully inserted into its registering-pocket.

Good thermal contact between a probe and the rotating member within the pocket is then best achieved by causing the exposed end face of the probe to bear firmly against the far end wall of the pocket into which the probe is inserted.

Advantageously, said annular portion of the sensor head carries in addition to said probes one or more rods that are inserted, when the annular portion advances for probe insertion, into flush fit in one or more recesses (say bores) of corresponding dimensions and shape. Such rods serve to relieve the probes of any torque-producing forces that they might otherwise be subjected to in the course of temperature recordal. The rods may pass freely through orifices in the generally cylindrical portion and advantageously lie behind the end face of the cylindrical portion when the annular portion is in its most rearward position in which the probes are retracted.

It will be realised that in many instances very gradual bringing of the sensor head into synchronous rotation with the rotating member may be very desirable or necessary. It is desirable also to be given some audible or visual indication of when synchronization and proper relative positioning of the rotating member and the sensor head has been achieved, rather than to be obliged to attempt blind insertion of the probes into their pockets and, where present, the said rods into their recesses. An arrangement which effectively achieves these ends is one in which the aforesaid attachment on the free exposed end of the rotating member and the exposed end face of the sensor head (advantageously the aforesaid generally cylindrical portion thereof) are formed with mutually mating male and female portions for head-centering and other mutually mating male and female portions of which the male portion or portions is or are resiliently mounted to allow rearward displacement to a non-mating portion and through which torque may be applied to the sensor head in order gradually to effect synchronization, said head-centering portions being on the axis of the rotating member and coacting to prevent non-axial movement of the sensor head while synchronization is being achieved (the male portion of the head-centering portions advantageously being provided by the sensor head and preferably having an end portion of enlarged diameter with a part-spherical end bearing surface) and the torque-transferring portions being so constructed and arranged that, on mating of the head-centering portions, the male portion or portions by reason of its or their being resiliently mounted and the sensor head not rotating at the same rate as the member until synchronization has been achieved, allows or allow temporary perpetuations of non-synchronous rotation by failing to mate finally with the female portion or portions, while nevertheless tending to advance and so to mate whenever temporarily in register with the female portion or portions in the course of each rotation of the rotating member with respect to the sensor head, which tendency being sufficient in the course of each revolution of the rotating member with respect to the sensor head to bring oblique surfaces on the male portion or portions into abutment with surfaces on the female portion or portions enabling pulses of sensor-head-accelerating forces to be applied.

Advantageously there are a plurality of pairs of so arranged and so constructed (and preferably similar) torque-transferring portions spaced about (preferably symmetrically and at equal distance from) the common axes of the sensor head and rotating member. The male portion of each torque-transferring portion is advantageously carried by the sensor head and preferably is composed of a ball resiliently seated in a cavity having a restricted opening in the end face of the sensor head so that only a minor portion of the ball protrudes through the restricted opening of the cavity and beyond the end face of the sensor head when resiliently urged up to its most forward position. The ball may conveniently be urged towards its most forward position by a compression spring.

The repeated knocking of the male portion or portions of the torque-transferring portions out of the certain degree of mating that they temporarily achieve whenever they are brought into register with the female portion or portions is audible and its reducing frequency as the motion of the sensor head approaches synchronization is a good indication of progress to that end. At synchronization of course, all knocking ceases, and the male portion or portions achieve final mating. It will be appreciated that where final mating can take place in more than one particular and predetermined relative rotational position of the sensor head with respect to the rotating member, it must be possible for the probes to be inserted into registering pockets in every one of those particular positions.

Advantageously, the end faces of the sensor head and the rotating member are, except where there are mutually composed of a ball resiliently seated in a cavity having a co-operating male or female portions, plane. Advantageously, when the head-centering male or female portions are fully mated there is a small gap between the faces of the sensor head and the rotating member.

The surface against which the torque-generating forces are applied must be oblique in order to achieve gentle bringing of the sensor head into synchronous motion with the member. The more inclined such surfaces are to directions parallel to the axis of rotation of the sensor head (i.e. the more oblique they are) the more gentle is the treatment of the sensor head, and more particularly its torque-transmitting male portion or portions, during its acceleration, all else being equal.

One form of apparatus constructed in accordance with the invention and suitable for use in the methods of the invention will now be described in greater detail by way of example only with reference to the accompanying drawing which is a diagrammatic axial sectional view.

The apparatus comprises an axially rotatably mounted sensor head indicated generally by the reference numeral 1, and a shaped plate-like attachment piece 2 that is attachable or attached to one end of a hot-relaxation roll 3 part only of which is shown and in dotted outline.

The sensor head 1 includes a cylindrical end portion 4 rigidly secured at one end of a freely rotatable hollow shaft 5, said shaft 5 being surrounded by a holding tube 6 from which it is spaced by annular bearings 7.

Keyed to the cylindrical portion 4 for rotation therewith is an annular portion 8 that closely surrounds the curved surface of the cylindrical portion 4 and is axially slidable thereon between an inoperative position as illustrated in the drawing and a forward position in which a pair of diametrically spaced temperature sensing probes (thermocouple junctions) 9 normally project well beyond the end face 4a of the cylindrical portion 4. Said probes 9 protrude in directions parallel to the axis of shaft 5 through bores 10 leading from pockets 11 which contain helical compression springs 12 tending to keep the probes in their illustrated fully extended positions and which are closed at their rearward ends by screws 13.

At the rearward end of the annular portion 8 and integral therewith is an annular plate 14 between the forward facing surface 14a of which and the base of a rearwardly facing annular groove 15 formed in the cylindrical portion 4 acts a helical compression spring 16. The spring 16 keeps the annular probe-carrying portion 8 normally in the position illustrated in which the probes 9 are behind the end face 4a of the cylindrical portion 4.

The annular portion 8 is keyed to the cylindrical portion 4 for rotation therewith by a groove 17 formed in the curved surface of the cylindrical portion 4 and extending parallel to the axis of shaft 5 which receives a stub projection 18 on the annular portion 8. The groove 17 does not extend over the entire length of the cylindrical portion and so provides an abutment surface 19 at its rearward end in the path of the stub projection 18 so limiting the rearward movement of the annular portion 8 on the cylindrical portion 4 under the action of spring 16.

The annular portion 8 is slidable forwards under manually applied force while the sensor head 1 is rotating by urging forwards a sleeve 20 which is slidable on the forward end portion of holding tube 6 and does not rotate with the sensor head 1. A catch spring 21 acts in common manner to allow the sleeve 20 to be brought into its proper position on the tube 6 during assembly of the apparatus simply by sliding along the tube 6 from the rearward end of the tube 6, but to prevent, unless depressed, return movement of the sleeve 20. It will be clear that the act of moving the annular portion 8 forwards should not have any substantial breaking effect on the sensor head 1 when the head 1 is revolving at roll speed lest synchronization be destroyed. It is not normally necessary, however, to provide a race of roller or ball bearings between the sleeve 20 and the plate 14, smooth low-friction bearing surfaces normally being adequate.

The end face 4a of the cylindrical portion 4 of the sensor head 1 carries an axially positioned boss 22 which terminates in an enlarged end portion of spherical profile. The boss 22 functions as the male portion of mating head-centering portions on the sensor head 1 and attachment piece 2.

Equi-spaced from the axis of the sensor head 1 and diametrically on opposite sides thereof are balls 23 that protrude partially through apertures 24, whose side-surfaces are part-spherical formed in the cylindrical portion 4. The balls 23 are urged into flush engagement with the curved side surfaces of apertures 24 by compression springs 25 contained in cylinders 26 that are secured by screw-threaded engagement to the cylindrical portion 4 at the base of the groove 15. Balls 23 present exposed oblique surfaces and if sufficient lateral force is applied to the protruding portions of balls 23 the balls 23 can be depressed to the level of the surface 4a. The balls 23 function as male portions of mating torque-transmitting portions on the sensor head 1 and the attachment piece 2.

The attachment piece 2, which is formed of tough insulating material, for example trade name "Tufnol" has an end face 2a which is plane except where provided with a central bore 27 of length slightly less than the length of boss 22 and of diameter equal to the maximum diameter of the enlarged end portion of the boss 22 (the bore 27 having a domed part-spherical end surface) and with shallow indents 28 of complementary dimensions to the protruding portions of the balls 23 on the sensor head 1.

In two rotary positions of the attachment piece 2 with respect to the sensor head 1, when the boss 22 of sensor head 1 is fully inserted into the bore 27 so that the plane faces of the sensor head 1 and the attachment piece lie parallel and close together, the protruding portions of the balls 23 are received by the idents 28 and coact, as male and female portions, so as to allow torque-generating forces to be applied from the attachment piece 2 to the sensor head 1. In all other rotary positions of the attachment piece 2, the balls 23 run on the plane face 2a of the attachment piece 2 and their springs 25 are partially compressed.

In each rotary position of the attachment piece 2 with respect to the sensor head 1 in which the balls 23 are received by the indents 28, the probes 9 should, when the apparatus is in use, be in register with axially extending pockets formed in the roll close beneath its curved yarn of filament-contacting surface.

At the rearward end of the shaft 5 are contact rings 29 (one pair only shown) from which extend current-carrying leads 30 to the probes 9. Leaf spring contacts 31, from which leads would extend when the apparatus is in use to temperature-recordal equipment, are attached to tube 6 and bear against rings 29 and so maintain electrical contact between the probes 9 and such temperature-recordal equipment as the sensor head 1 rotates on its holding tube 6.

So as to relieve the probes 9 of possible strain during roll-temperature recordal and, more especially, during their insertion into the pockets in the rolls, pins (not shown) of substantial diameter and hence robustness may advantageously be carried on the forward facing surface 14a of plate 14 which extend parallel to the axis of the shaft 5 to positions at least as far in the forward directions as the free ends of the probes 9 in their forwardmost positions, but not as far as the face 4a of the cylindrical portions 4 when the annular portion 8 is in its normal, most rearward, position as shown in the drawing. Holes (not shown) allowing the pins to pass freely beyond the face 4a of the cylindrical portion 4 would be formed in the cylindrical portion 4 and registering holes (not shown) would be formed in the attachment piece 2 (which if necessary would extend into the rolls beyond) which would make a close fit with the pins. It will be evident that once the pins have been even partially inserted into their registering holes they prevent the sensor head 1 losing synchronization during temperature recordal.

In an alternative arrangement, the cylindrical portion 4 of the sensor head 1 is formed of a tough material of poor thermal conductivity such as trade name "Tufnol" and the attachment piece 2 need not then be formed of a material of poor thermal conductivity. Heat loss to the balls 23 and boss 22 can be ignored. When a so-constructed sensor head is used, an attachment piece is not required since the end face of the member whose temperature is to be recorded could be shaped to provide the necessary portions mating with portions on the sensor head.

What we claim is:

1. Apparatus for measuring the surface temperature of a heated-rotatable member, said member being driven from one end and having pockets beneath said surface arranged substantially parallel to the axis of rotation of said member and having entrances at the end of said member remote from said driven end comprising in combination, a means comprising the end face of said member remote from said driven end and a sensor head mounted for free rotation, and end face means and said sensor head having mutually co-operating male and female head centering means and male and female torque-transmission and gradual speed synchronization means, said male parts of said torque transmitting and gradual speed synchronization means being resiliently yieldably mounted and presenting oblique abutment surfaces to the associated female parts whenever said male and female parts are in register, said sensor head carrying for rotation therewith temperature sensing means, said sensing means being moveable in a direction parallel to said axis of rotation with respect to said head from a position wherein said temperature sensing means does not intrude into said pockets to a position wherein, upon said speed synchronization, said temperature measuring means does intrude into said pockets, said sensor head other than said sensing means being substantially thermally isolated from said member and said sensing means being adapted for connection to temperature indicating means.

2. Apparatus as claimed in claim 1 wherein said sensor head comprises a generally cylindrical portion that interacts with said heated-rotatable member to achieve said synchronous rotation therewith and an annular temperature sensing means carrying portion that closely surrounds and rotates with said cylindrical portion and can slide axially with respect to the cylindrical portion.

3. Apparatus as claimed in claim 1 wherein said sensing means is resiliently mounted.

4. Apparatus as claimed in claim 2 wherein said sensing means is resiliently mounted.

5. Apparatus as claimed in claim 2 wherein said cylindrical portion and said annular portion interact through resilient means.

6. Apparatus as claimed in claim 4 wherein said cylindrical portion and said annular portion interact through resilient means.

References Cited

UNITED STATES PATENTS

| 3,183,718 | 5/1965 | Schnedler | 73—351 |
| 3,191,437 | 6/1965 | Heard | 73—359 |
| 3,204,462 | 9/1965 | Horne | 73—359 |
| 3,246,519 | 4/1966 | Dornberger | 73—351 |

DAVID SCHONBERG, *Primary Examiner.*

NEIL B. SIEGEL, *Assistant Examiner.*